Patented Mar. 15, 1938

2,110,896

UNITED STATES PATENT OFFICE 2,110,896

INSECTICIDE

Donald L. Vivian and Herbert L. J. Haller, Washington, D. C.; dedicated to the free use of the Public in the territory of the United States of America No Drawing. Application June 27, 1936, Serial No. 87,742

3 Claims. (Cl. 167—31)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government for governmental purposes without the payment to us of any royalty thereon.

We hereby dedicate the invention herein described to the free use of the Public in the territory of the United States of America to take effect upon the granting of a patent to us.

This invention relates to improvements in materils for destroying a checking the growth or multiplication of living organisms, whether plant or animal, which are economically injurious to man.

An object of the invention is to provide materials suitable for use as insecticides.

Another object of the invention is to provide a material for dusting or spraying delicate vegetation such as bean plants, peach trees, and plants grown under glass, which will not cause injury to foliage.

Another object of the invention is to provide a material which is relatively non-toxic to man and domestic animals when taken by mouth, and which can be used in place of lead arsenate and other arsenicals for destroying insects without leaving harmful residues on fruits and vegetables.

We have found that substances belonging to a certain class of organic compounds have a specific toxic effect upon harmful insects and our invention consists in the application of said substances to the destruction of insect pests.

The novel insecticides found by us belong to the class of organic compounds which contain in their molecules, according to accepted formulation, two homocyclic nuclei joined by an azo linkage, that is, by the —N=N— group, and which contain, in addition, one or more hydroxyl groups, together with one or more alkyl or aryl groups.

Typical representatives of this class of compounds are:

4-Phenylazo-o-cresol:

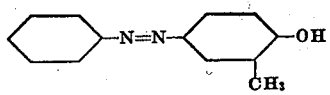

4-Phenylazo-m-cresol:

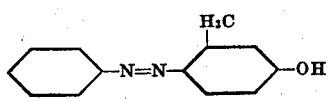

p-(o-Tolylazo)-phenol:

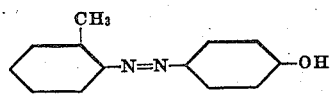

4-Phenylazo-2,5-xylenol:

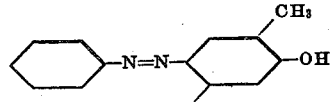

1-(p-Tolylazo)-2-naphthol:

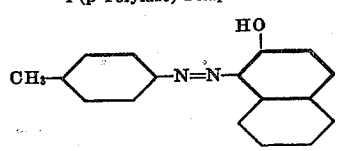

But these examples are representative only and are not intended to comprise all the compounds which fall under the definition of the paragraph immediately above.

These compounds may be made by interaction of phenols, either unsubstituted or containing one or more aryl or alkyl groups, with aryl diazonium salts which may likewise be unsubstituted or contain one or more alkyl or aryl groups. Variations in the methods of preparation can be readily made by one skilled in the art, but these methods do not affect the novel features claimed.

For specific examples of the toxicity of these compounds it may be stated that when 4-Phenylazo-m cresol was dissolved in acetone and the resulting solution poured into water there resulted a 90% mortality of culicine mosquito larvae within 16 hours when the concentration of the azo compound was one part to 50,000 parts of water.

When 4-Phenylazo-o-cresol was dissolved in acetone and the resulting solution poured into water there resulted a 98% mortality of culicine mosquito larvae within 16 hours when the concentration of the azo compound was one part to 25,000 parts of water.

The above examples are not to be construed as limiting either the method of application of these novel insecticides or the kinds of insects to which they may be applied.

These aryl hydroxyazo compounds may be applied in a manner similar to that in which insecticides in general are used, that is, as dusts, or in the form of solutions or suspensions in various media, such as water, kerosene, etc., and either with or without the use of spreaders, wetting agents, or sticking agents.

Having thus described our invention we claim:

1. An insecticide comprising a compound of the general formula:

$$CH_3—R_1—N=N—R_2—OH$$

where $R_1$ and $R_2$ denote interchangeable homocyclic aryl nuclei, $R_1$ being a single benzene ring and $R_2$ a naphthyl nucleus.

2. An insecticide containing as its essential active ingredient 1-(o-Tolylazo)-2-naphthol.

3. An insecticide contaning as its essential active ingredient 4-(o-Tolylazo)-1-naphthol.

DONALD L. VIVIAN.
HERBERT L. J. HALLER.